United States Patent
Moradisizkoohi et al.

(10) Patent No.: US 10,381,951 B1
(45) Date of Patent: Aug. 13, 2019

(54) FAMILY OF MODULAR QUASI-RESONANT INVERTERS

(71) Applicants: Hadi Moradisizkoohi, Miami, FL (US); Noureldeen Elsayad, Miami, FL (US); Osama A. Mohammed, Miami, FL (US)

(72) Inventors: Hadi Moradisizkoohi, Miami, FL (US); Noureldeen Elsayad, Miami, FL (US); Osama A. Mohammed, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 16/206,011

(22) Filed: Nov. 30, 2018

(51) Int. Cl.
*H02M 7/537* (2006.01)
*H02M 7/48* (2007.01)

(52) U.S. Cl.
CPC .... *H02M 7/537* (2013.01); *H02M 2007/4815* (2013.01); *H02M 2007/4822* (2013.01)

(58) Field of Classification Search
CPC ......... H02M 7/537; H02M 2007/4815; H02M 2007/4822
See application file for complete search history.

(56) References Cited

U.S. PATENT DOCUMENTS

| | | | |
|---|---|---|---|
| 2015/0028794 A1* | 1/2015 | Flett | H02M 7/537 320/101 |
| 2015/0381074 A1* | 12/2015 | Flett | H02M 7/537 320/101 |
| 2016/0322917 A1* | 11/2016 | Matsuoka | H02M 7/493 |

OTHER PUBLICATIONS

Tymerski et al., Oct. 1989, IEEE Trans. on Power Electronics, vol. 4, 381-390.*

* cited by examiner

*Primary Examiner* — Jue Zhang
(74) *Attorney, Agent, or Firm* — Saliwanchik, Lloyd & Eisenschenk

(57) ABSTRACT

A modular quasi-resonant inverter can include: a first resonant inverter unit including a first terminal, a second terminal, a third terminal, and fourth terminal; a second resonant inverter unit including a fifth terminal, a sixth terminal, a seventh terminal, and an eighth terminal; and an input capacitor connected between the first terminal and the second terminal. The first terminal and the fifth terminal can be configured such that a first source is connected between the first terminal and the fifth terminal, and the third terminal and the fourth terminal can be configured such that a second source is connected between the third terminal and the fourth terminal. The second terminal, the fourth terminal, the sixth terminal, and the eighth terminal can be configured to be electrically connected to each other.

20 Claims, 13 Drawing Sheets

FAMILY OF MODULAR QUASI-RESONANT INVERTERS

BACKGROUND

DC/AC converters play an important role in the integration of energy storage and renewable energy resources, hybrid DC/AC converter for home applications, AC motor drives, and electric vehicles, where efficiency and power density are vital design criteria. In the related art, Voltage Source Inverters (VSIs) and Current Source Inverters (CSIs) are the most common converters for various applications; however, recently, a progressively rapid pace of change has been observed, principally because of the advent of Z-source inverters. Generally, to supply loads that need higher AC voltage, a DC/DC converter followed by a DC/AC converter is employed, in which a bulky 60-Hz transformer is used, resulting in low power density. A high step-up DC/DC converter with a high-frequency transformer is another approach to reduce the size of the system. Using a high-frequency transformer in the DC/AC stage, known as high-frequency link (HFL) converters, is the third common architecture. However, the number of switches in such HFL converters is high, leading to complex control circuitry.

BRIEF SUMMARY

Embodiments of the subject invention provide novel and advantageous modular quasi-resonant inverters that comprise two resonant inverters, a source connected to a low voltage side of the resonant inverters, and a load connected to a high voltage side of the resonant inverters, thereby accomplishing soft-switching for a wide range of loads.

In an embodiment, a modular quasi-resonant inverter can comprise: a first resonant inverter unit including a first terminal, a second terminal, a third terminal, and fourth terminal; and a second resonant inverter unit including a fifth terminal, a sixth terminal, a seventh terminal, and an eighth terminal. The first terminal and the fifth terminal can be configured such that a first source is connected between the first terminal and the fifth terminal, and the second terminal, the fourth terminal, the sixth terminal, and the eighth terminal can be configured to be electrically connected to each other.

In another embodiment, a modular quasi-resonant inverter can comprise: a first resonant inverter unit including a first terminal, a second terminal, a third terminal, and fourth terminal; a second resonant inverter unit including a fifth terminal, a sixth terminal, a seventh terminal, and an eighth terminal; and an input capacitor connected between the first terminal and the second terminal. The first terminal and the fifth terminal can be configured such that a first source is connected between the first terminal and the fifth terminal, the third terminal and the fourth terminal can be configured such that a second source is connected between the third terminal and the fourth terminal, and the second terminal, the fourth terminal, the sixth terminal, and the eighth terminal can be configured to be electrically connected to each other.

In yet another embodiment, a modular quasi-resonant inverter can comprise: a first resonant inverter unit including a first terminal, a second terminal, a third terminal, and fourth terminal; a second resonant inverter unit including a fifth terminal, a sixth terminal, a seventh terminal, and an eighth terminal; an input capacitor connected between the first terminal and the second terminal; a first source connected between the first terminal and the fifth terminal; and a second source connected between the third terminal and the fourth terminal. The first resonant inverter unit can comprise: a first switch connected between a first node and a second node; a second switch connected between the second node and a third node; a third switch connected between the third node and a fourth node; a fourth switch connected between the fourth node and a fifth node; a first inductor connected between the first terminal and the second node; a first auxiliary capacitor and a second inductor connected between the second node and the fourth node; a first output capacitor connected between the first node and the third node; and a second output capacitor connected between the third node and the fifth node. The second resonant inverter unit can comprise: a fifth switch connected between a second unit first node and a second unit second node; a sixth switch connected between the second unit second node and a second unit third node; a seventh switch connected between the second unit third node and a second unit fourth node; an eighth switch connected between the second unit fourth node and a second unit fifth node; a third inductor connected between the fifth terminal and the second unit second node; a second unit auxiliary capacitor and a fourth inductor connected between the second unit second node and the second unit fourth node; a second unit first output capacitor connected between the second unit first node and the second unit third node; and a second unit second output capacitor connected between the second unit third node and the second unit fifth node. The first node can be configured to be electrically connected to the second terminal and the fourth terminal, the fifth node can be configured to be electrically connected to the third terminal, the second unit first node can be configured to be electrically connected to the sixth terminal and the eighth terminal, the second unit fifth node can be configured to be electrically connected to the seventh terminal, and the second terminal, the fourth terminal, the sixth terminal, and the eighth terminal can be configured to be electrically connected to each other.

DETAILED DESCRIPTION

Advances in single-stage converters, coupled with new control techniques, have the potential to give rise to a new generation of high-efficiency converters with high power density. The Modular Quasi-Resonant Inverters (MQRIs) of embodiments of the subject invention provide high voltage gain for input source without utilizing any transformer (i.e., it can be the case that no transformer is present in many embodiments of the subject invention), resulting in higher power density and higher efficiency. In many embodiments of the subject invention, a resonant circuit is employed not only to achieve soft switching for all switches but to limit the inrush current during start-up. Indeed, the resonant circuit operates like a series resonant tank but controlled by a simple pulse width modulation (PWM). Thus, converters of embodiments of the subject invention can handle the complexity of frequency modulation (FM). Moreover, due to the use of an active-clamp configuration, the voltage stress of switches of the MQRI are confined; consequently, switches with small on-resistance $R_{DS(on)}$ can be used leading to increased efficiency. To achieve a more compact system, the inverter can be implemented using gallium nitride (GaN) switches, which can improve the efficiency owing to their low on-resistance $R_{DS(on)}$, small gate charge, and zero reverse-recovery charge.

Figure 1A:
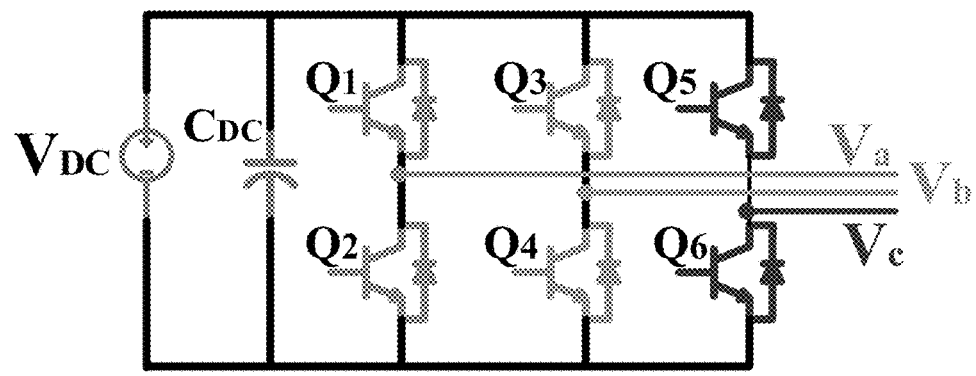
FIG. 1(a) shows a schematic of a three-phase buck voltage source inverter (VSI).

FIG. 1(a) shows a schematic of a three-phase buck voltage source inverter (VSI). Referring to FIG. 1(a), the three-phase buck VSI comprises six switches including Q1, Q2, Q3, Q4, Q5, and Q6 that form three legs. The six switches can be made of a metal-oxide-semiconductor field-effect transistor (MOSFET) or an insulated-gate bipolar transistor (IGBT). The three-phase buck VSI is very simple and is used in uninterruptible power supply (UPS), electronic frequency, and adjustable speed drives, among other applications. The voltages Va, Vb, and Vc of the three-phase VSI generally have the same magnitude and frequency but their phases are 120° apart. Any false turn-on in each leg caused either by purpose or by electromagnetic interference (EMI) can make the shoot-through problem that would destroy the device. Meanwhile, the magnitude of output alternating current (AC) voltages Va, Vb, and Vc is limited by the voltage level of a direct current (DC) source $V_{DC}$.

Figure 1B:
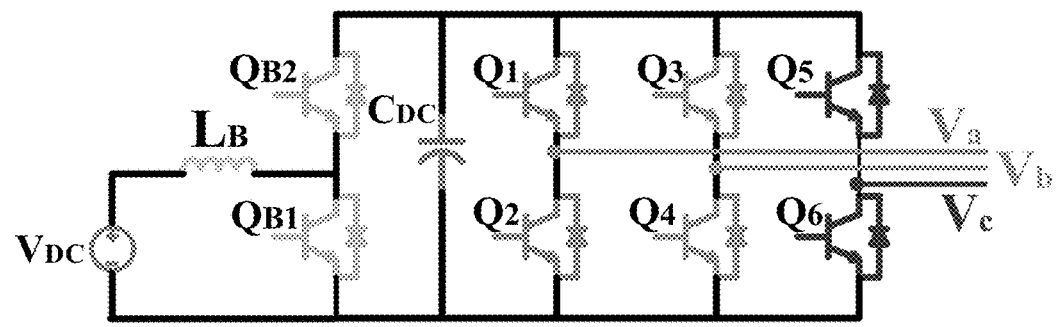
FIG. 1(b) shows a schematic of a three-phase bi-directional boost voltage source inverter (VSI).

FIG. 1(b) shows a schematic of a three-phase bi-directional boost VSI. Referring to FIG. 1(b), the three-phase bi-direction boost VSI comprises a boost converter added to the VSI for applications with low and unregulated input voltage, therefore, to enhance the magnitude of DC voltage. That is, the three-phase bi-direction boost VSI further comprises the boost switches $Q_{B1}$ and $Q_{B2}$, and an inductor $L_B$.

Figure 2A:
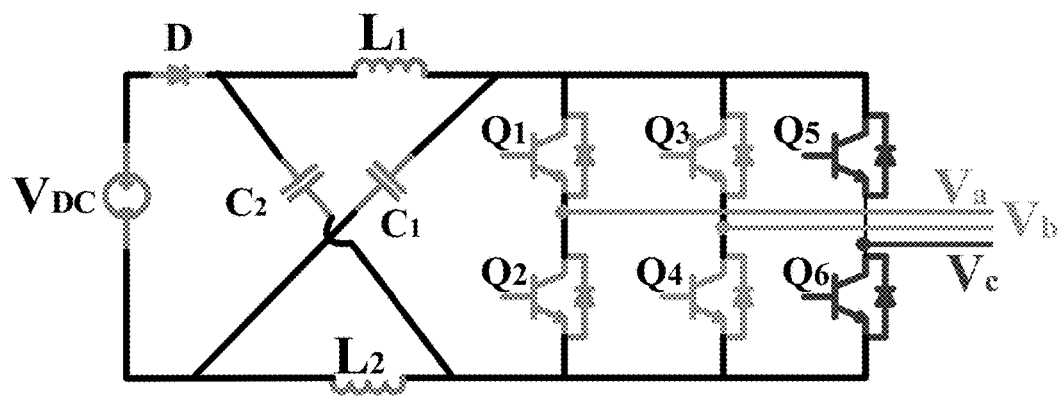
FIG. 2(a) shows a schematic of a three-phase unidirectional Z-source inverter (ZSI).
Figure 2B:
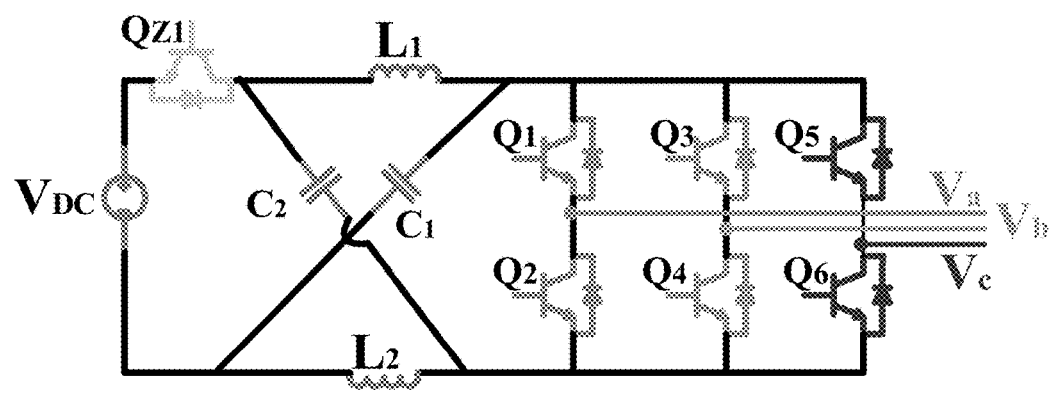
FIG. 2(b) shows a schematic of a three-phase bi-directional Z-source inverter (ZSI).

FIGS. 2(a) and 2(b) show schematics of three-phase unidirectional and a bi-directional Z-source inverters (ZSIs), respectively. ZSI employs an impedance network to overcome the limitations of the conventional VSI converter, which can either increase or decrease the input voltage. That is, ZSI is a buck-boost converter that can provide unique features in terms of having a wide range of output ac voltage. The shoot-through state is an important characteristic of ZSI paving the way to realize the buck-boost performance.

Figure 2C:
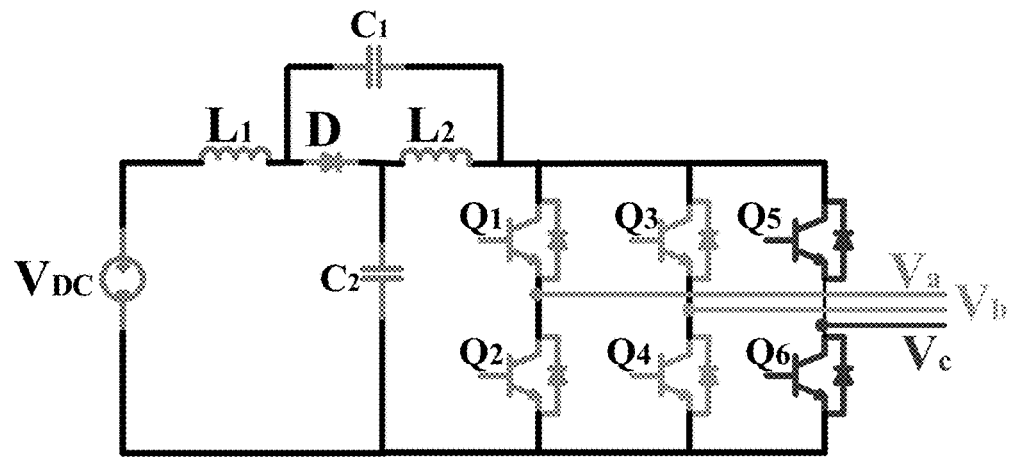
FIG. 2(c) shows a schematic of a three-phase unidirectional quasi Z-source inverter (qZSI).
Figure 2D:
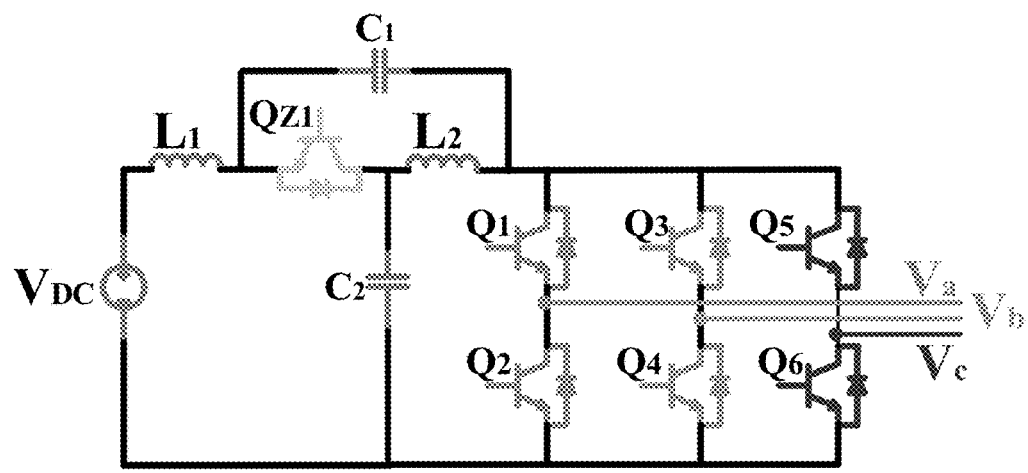
FIG. 2(d) shows a schematic of a three-phase bi-directional quasi Z-source inverter (qZSI).

FIGS. 2(c) and 2(d) show schematics of three-phase unidirectional and bi-directional quasi ZSIs (qZSIs), respectively. qZSI is a new version of ZSI that draws a continuous constant current from a DC source, a vital feature to tackle the problem of using a large electrolytic capacitor in VSI. It can handle a wide range of DC voltage as a result of buck-boost operation. Using components with lower ratings and reducing the stress of the source are the other advantages of qZSI.

Figure 3A:
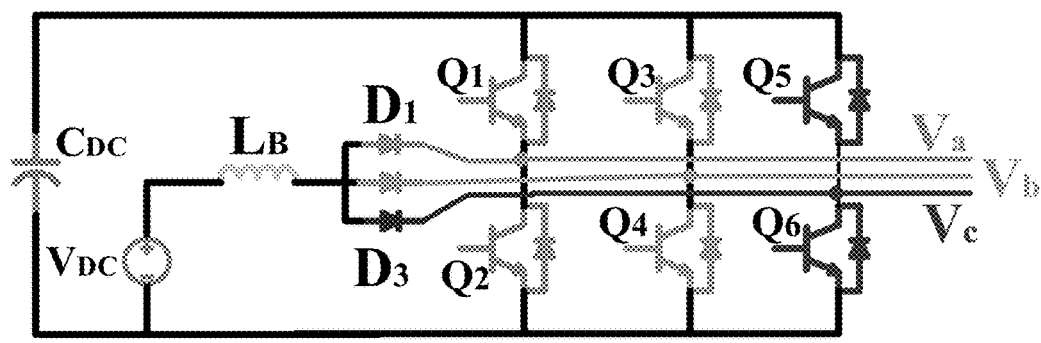
FIG. 3(a) shows a schematic of a three-phase unidirectional split source inverter (SSI).
Figure 3B:
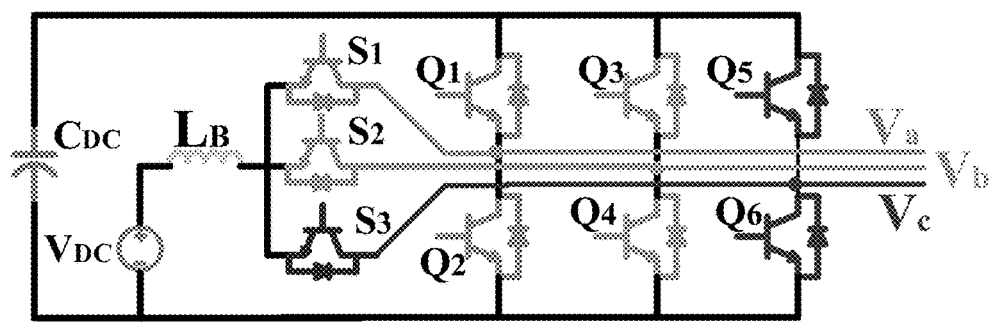
FIG. 3(b) shows a schematic of a three-phase bi-directional split source inverter (SSI).

FIGS. 3(a) and 3(b) show schematics of three-phase unidirectional and bi-directional split source inverters (SSIs), respectively. The SSI is derived based on the combination of a three-phase split inverter (SI) and a conventional boost converter. It uses a lower number of passive components in comparison to the ZSI. SSI utilizes the same modulation technique used in VSI, compared with ZSI that needs an extra switching state. Having a filter inductor in the DC side, SSI also draws a continuous input current.

Figure 4A:
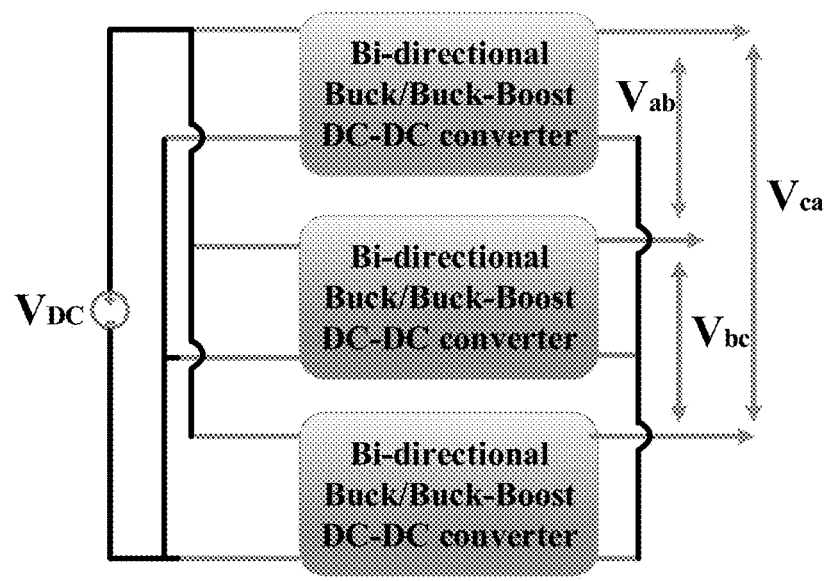
FIG. 4(a) shows a schematic of a three-phase differential-mode inverter (DMI).

FIG. 4(a) shows a schematic of a three-phase differential-mode inverter (DMI). Referring to FIG. 4(a), DMI is derived by integrating the buck or buck-boost dc-dc converters, which are paralleled in the input side, and the output terminals are connected in a way to create a common ground for all of them. DMI is capable of operating in buck-boost mode, improving the power density, and reducing the cost. Lack of a large electrolytic capacitor in the input side brings the foremost advantage of DMI because this capacitor deteriorates the reliability of the system.

Figure 4B:
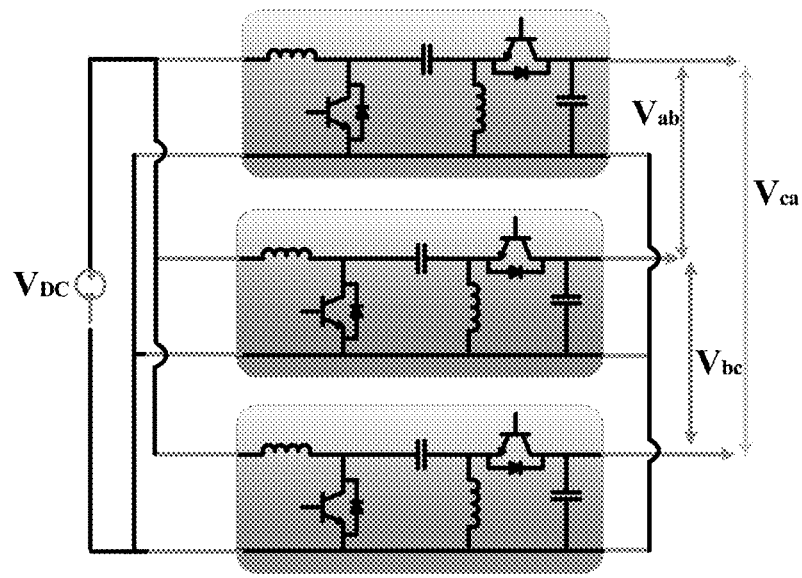
FIG. 4(b) shows a schematic of a bi-directional SEPIC DMI.

FIG. 4(b) shows a bi-directional SEPIC DMI. Referring to FIG. 4(b), each cell generates an output voltage including an ac voltage superimposed on a dc offset component. Meanwhile, the common dc component of each phase is decoupled from the load due to differential-mode performance.

Figure 4C:
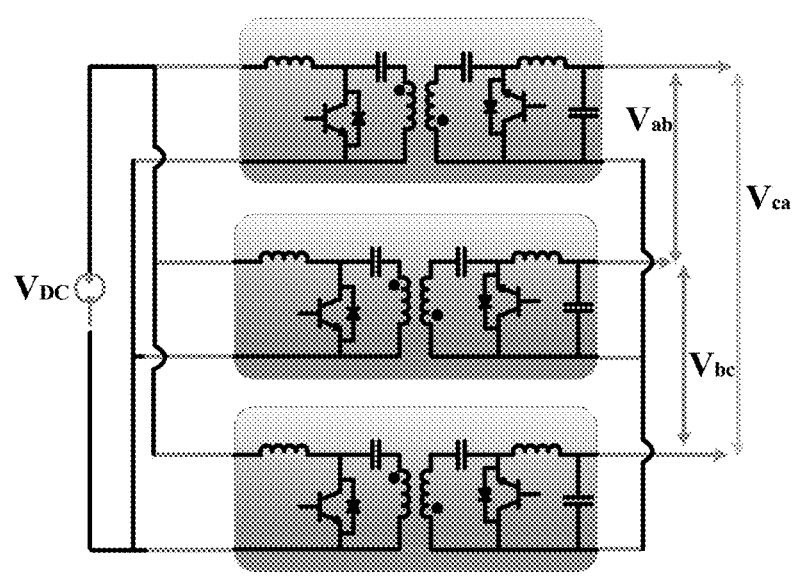
FIG. 4(c) shows a schematic of an isolated version of Ćuk DMI.

Differential-mode connection allows the designer to utilize the different dc/dc converters with continuous input current to generate a three-phase ac voltage without any electrolytic capacitor. FIG. 4(c) shows an isolated version of Ćuk DMI. Referring to FIG. 4(c), the isolated version of Ćuk DMI can be derived by modifying the simple Ćuk converter and employing a transformer, which is beneficial for some applications where isolation is necessary. A high-frequency transformer used in this converter can enhance the voltage gain dramatically, so a low-voltage dc voltage can be used in the input terminal. As a result, this topology is a good candidate for renewable energy applications such as photovoltaics (PV) and fuel-cells (FCs), in which the input voltage is low and unregulated.

In an embodiment of the subject invention, an inverter includes half-bridge modules to generate the high-voltage from the distributed energy resources such as PV and FC, which are low, unregulated voltage sources. Because current GaN switches cannot tolerate a voltage beyond 650 V, to extend their applications in different voltage levels, each module can distribute the voltage stress across switches by using the active clamp circuit; thus, GaN switches with low rated-voltage and low on-resistance $R_{DS(ON)}$ can be employed. The switching loss is the major factor for losses in the converters, which can be alleviated by utilizing soft-switching. A resonant tank is utilized to shape the current and voltage waveforms so that the soft-switching can be achieved. Meanwhile, one important difference with respect to the conventional resonant converters is that the control technique can be conventional PWM, which is very simple compared to FM. In fact, the advantages of resonant circuits in terms of soft-switching for a wide range of loads are attained without using FM technique. These modules are connected in parallel in the input side and differential-mode in the output side such that a one-phase and three-phase sinusoidal wave can be generated from two and three modules, respectively.

Because the family of inverters according to embodiments of the subject invention are appropriate for high-density applications, such as renewable energy resources, their switching frequency can be very high, more than 50 kHz; thus, they can be implemented by GaN or silicon carbide (SiC) MOSFETs. However, regarding the small on-resistance $R_{DS(ON)}$ of GaN switches, they are superb candidates for the distributed energy resources applications.

Figure 5:
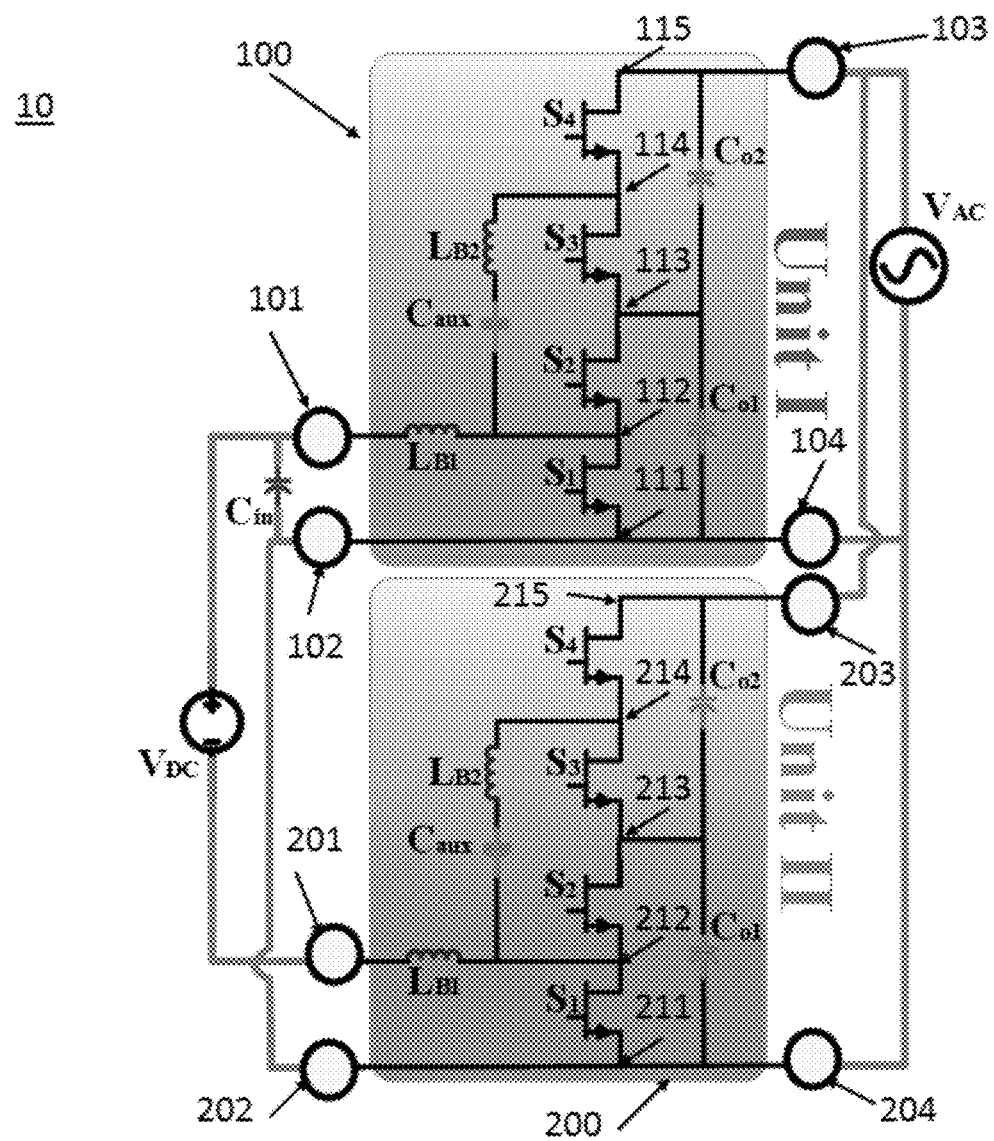
FIG. 5 shows a single-phase boost version of a modular quasi-resonant inverter according to an embodiment of the subject invention.

FIG. 5 shows a single-phase boost version of a modular quasi-resonant inverter (MQRI) according to an embodiment of the subject invention. Referring to FIG. 5, a single-phase boost MQRI 10 comprises a first resonant inverter unit 100 and a second resonant inverter unit 200 that have an identical circuit structure. That is, the single-phase three-level boost MQRI 10 can be synthesized with two units 100 and 200, where a source is connected as $V_{DC}$ to the low-voltage side, and the load is connected as $V_{AC}$ to the high-voltage side. The dc voltage source $V_{DC}$ is not connected between a first terminal 101 and a second terminal 102 of the first resonant inverter unit 100, and between a fifth terminal 201 and a sixth terminal 202 of the second resonant inverter unit 200, but connected between the first terminal 101 of the first resonant inverter unit 100 and the fifth terminal 201 of the second resonant inverter unit 200. By contrast, the ac voltage source $V_{AC}$ is connected between a third terminal 103 and a fourth terminal 104 of the first resonant inverter unit 100 and between a seventh terminal 203 and an eighth terminal 204 of the second resonant inverter unit 200, wherein the third terminal 103 and the seventh terminal 203 are connected to each other, and the fourth terminal 104 and the eighth terminal 204 are connected to each other. In addition, the single-phase boost MQRI 10 further comprises an input capacitor $C_{in}$ connected between the first terminal 101 and the second terminal 102.

The first resonant inverter unit 100 comprises four switches that are connected in series. A first switch $S_1$ is connected between a first node 111 and a second node 112, a second switch $S_2$ is connected between the second node 112 and a third node 113, a third switch $S_3$ is connected between the third node 113 and a fourth node 114, and a fourth switch $S_4$ is connected between the fourth node 114 and a fifth node 115. In addition, a first inductor $L_{B1}$ is connected between the first terminal 101 and the second node 112, and a first auxiliary capacitor $C_{aux}$ and a second inductor $L_{B2}$ are connected between the second node 112 and the fourth node 114. The first resonant inverter unit 100 further comprises a first output capacitor $C_{o1}$ connected between the first node 111 and the third node 113, and a second output capacitor $C_{o2}$ connected between the third node 113 and the fifth node 115. The first node 111 is configured to be electrically connected to the second terminal 102 and the fourth terminal 104, and the fifth node 115 is configured to be electrically connected to the third terminal 103.

The second resonant inverter unit 200 has the same circuit elements as those of the first resonant inverter unit 100. For example, the second resonant inverter unit 200 comprises four switches including a fifth switch $S_1$, a sixth switch $S_2$, a seventh switch $S_3$, and an eighth switch $S_4$. The fifth switch $S_1$ is connected between a second unit first node 211 and a second unit second node 212, the sixth switch $S_2$ is connected between the second unit second node 212 and a second unit third node 213, the seventh switch $S_3$ is connected between the second unit third node 213 and a second unit fourth node 214, and the eighth switch $S_4$ is connected between the second unit fourth node 214 and a second unit fifth node 215. The second resonant inverter unit 200 comprises a third inductor $L_{B1}$ connected between the fifth terminal 201 and the second unit second node 212, a second unit auxiliary capacitor $C_{aux}$ and a fourth inductor $L_{B2}$ connected between the second unit second node 212 and the second unit fourth node 214. In addition, second resonant inverter unit 200 comprises a second unit first output capacitor $C_{o1}$ connected between the second unit first node 211 and the second unit third node 213, and a second unit second output capacitor $C_{o2}$ connected between the second unit third node 213 and the second unit fifth node 215. The second unit first node 211 is configured to be electrically connected to the sixth terminal 202 and the eighth terminal 204, and the second unit fifth node 215 is configured to be electrically connected to the seventh terminal 203. As a result, the second terminal 102, the fourth terminal 104, the sixth terminal 202, and the eighth terminal 204 are configured to be electrically connected to each other.

Figure 6:
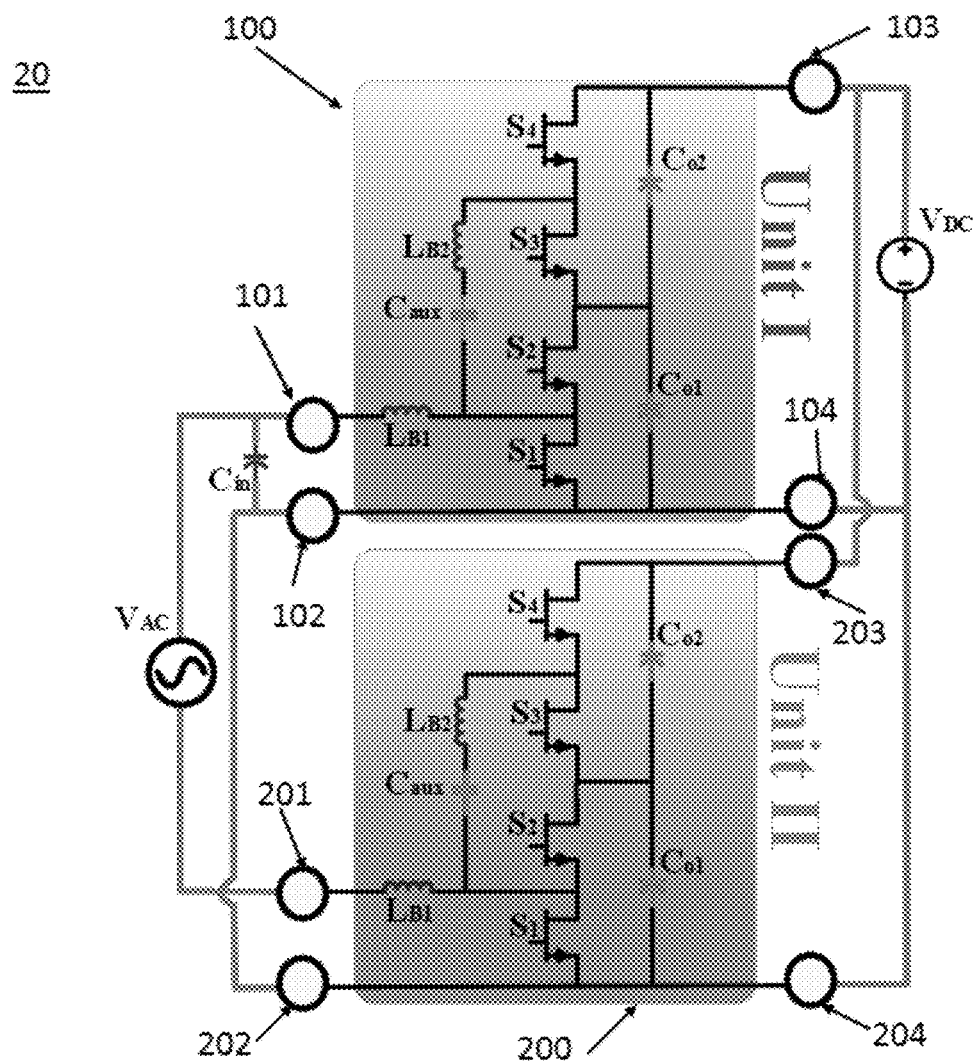
FIG. 6 shows a single-phase buck version of a modular quasi-resonant inverter according to an embodiment of the subject invention.

FIG. 6 shows a single-phase buck version of a modular quasi-resonant inverter according to an embodiment of the subject invention. Referring to FIG. 6, a source is connected as $V_{DC}$ to the high-voltage side and the load is connected as $V_{AC}$ to the low-voltage side, in which the output ac voltage is lower than the input dc voltage. That is, the single-phase buck MQRI of FIG. 6 has the same structure as that of the single-phase boost MQRI of FIG. 5, and exchanges the positions of the source and the load.

The single-phase buck MQRI 20 comprises the first resonant inverter unit 100 and the second resonant inverter unit 200. The ac voltage source $V_{AC}$ as the load is connected between the first terminal 101 and the fifth terminal 201, and the dc voltage source $V_{DC}$ is connected between the third terminal 103 and the fourth terminal 104 of the first resonant inverter unit 100 and between the seventh terminal 203 and the eighth terminal 204 of the second resonant inverter unit 200. The second terminal 102 is connected to the sixth terminal 202.

Figure 7:
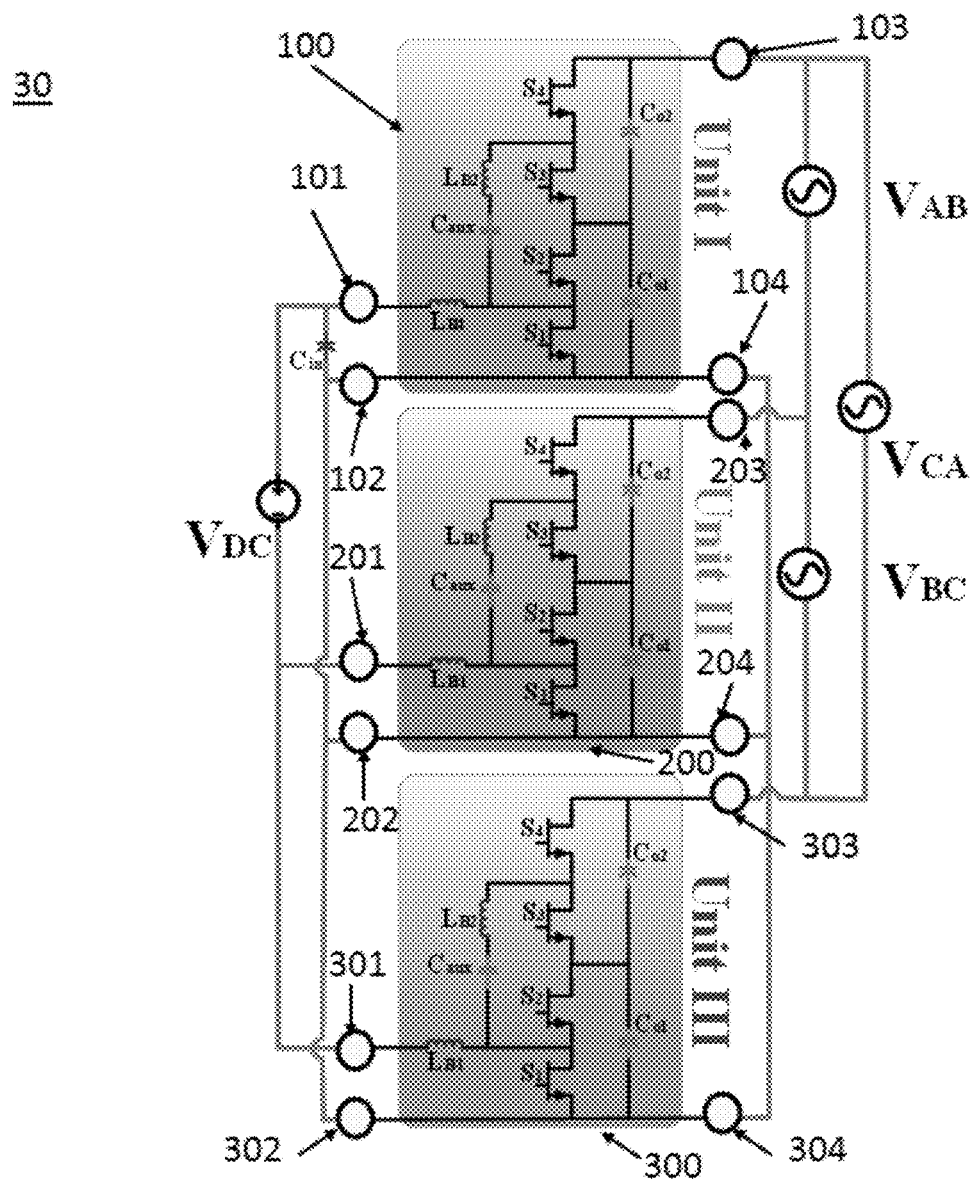
FIG. 7 shows a three-phase boost version of a modular quasi-resonant inverter according to an embodiment of the subject invention.

FIG. 7 shows a three-phase boost version of a modular quasi-resonant inverter according to an embodiment of the subject invention. In particular, FIG. 7 shows a three-phase bi-directional system with three GaN-based single-stage quasi-resonant modules presented for renewable energy sources application, such as PV. Three GaN-based single-stage quasi-resonant modules are connected in the differential mode.

Referring to FIG. 7, a three-phase boost MQRI 30 comprises the first resonant inverter unit 100 and the second resonant inverter unit 200 of the single-phase MQRI 10, and further comprise a third resonant inverter unit 300 similar to the first resonant inverter unit 100. The third resonant inverter unit 300 includes a ninth terminal 301, a ten terminal 302, an eleventh terminal 303, and a twelfth terminal 304. The ninth terminal 301 is configured to be electrically connected to the fifth terminal 201, the tenth terminal 302 is configured to be electrically connected to the second terminal 102 and the sixth terminal 202, and the twelfth terminal 304 is configured to be electrically connected to the fourth terminal 104 and the eighth terminal 204. While the dc voltage source $V_{DC}$ is connected between the first terminal 101 and the fifth terminal 201, the first ac voltage source $V_{AB}$ is connected between the third terminal 103 and the seventh terminal 203, the second ac voltage source $V_{BC}$ is connected between the seventh terminal 203 and the eleventh terminal 303, and the third ac voltage source $V_{CA}$ is connected between the eleventh terminal 303 and the third terminal 103.

Figure 8:
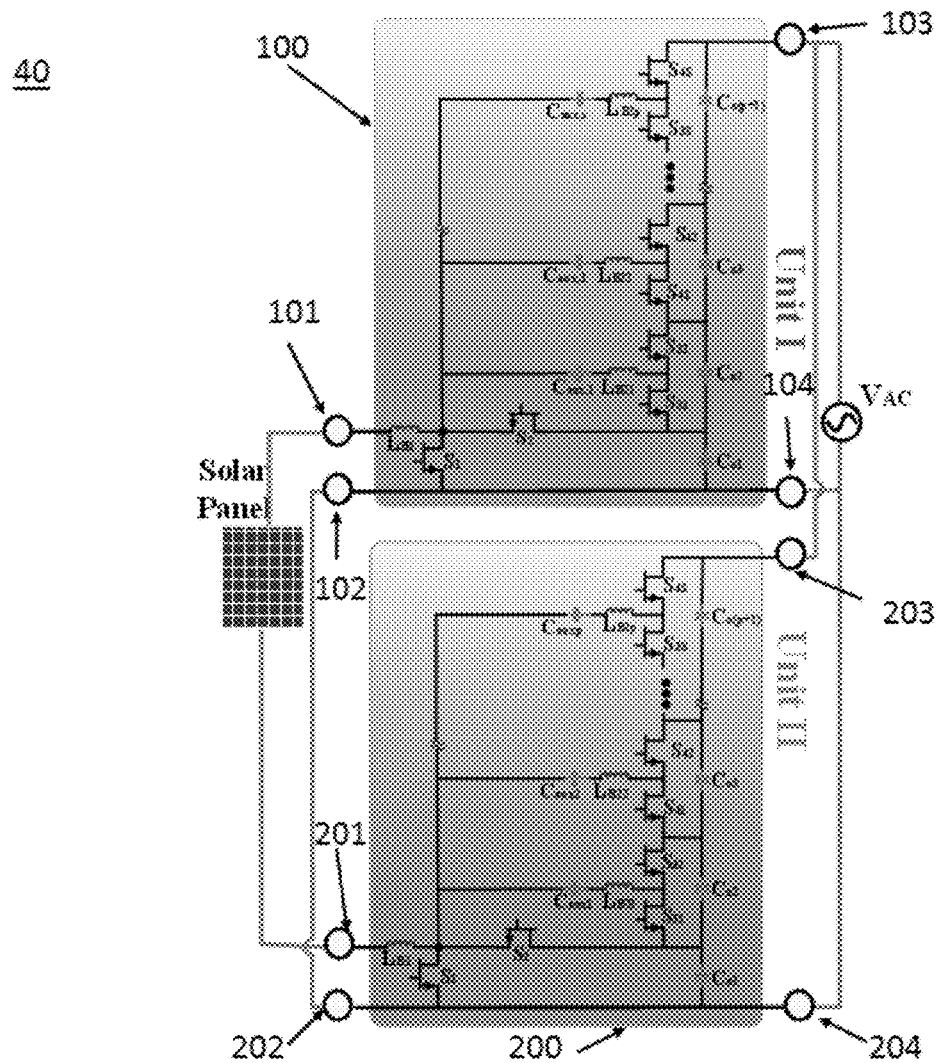
FIG. 8 shows a single-phase boost modular quasi-resonant inverter with high voltage gain for low voltage input source according to an embodiment of the subject invention.

Inverter according to embodiments of the subject invention can be used for producing ac voltage from renewable energy resources. As an example, a solar panel can be connected to the input side of an inverter that includes two modules, as shown in FIG. 8. FIG. 8 shows a single-phase boost modular quasi-resonant inverter with high voltage gain for low voltage input source according to an embodiment of the subject invention. Referring to FIG. 8, a single-phase boost MQRI 40 with high voltage gain for low-voltage input source includes a solar panel connected between the first terminal 101 of the first resonant inverter 100 and the fifth terminal 201 of the second resonant inverter 200, and the ac voltage source $V_{AC}$ connected between the third terminal 103 and the fourth terminal 104. The second terminal 102 is configured to be connected to the sixth terminal 202, the third terminal 103 is configured to be connected to the seventh terminal 203, and the fourth terminal 104 is configured to be connected to the eighth terminal 204. Though the first 100 and the second 200 resonant inverter units are identical to each other, the internal circuit structure of the first resonant inverter unit 100 of FIG. 8 can be different from the internal circuit structure of the first resonant inverter unit 100 of FIG. 5. In this application of FIG. 8, a high voltage gain is the major requirement; so, more number of modules can be added to the proposed inverter to enhance the voltage gain ratio.

Figure 9:
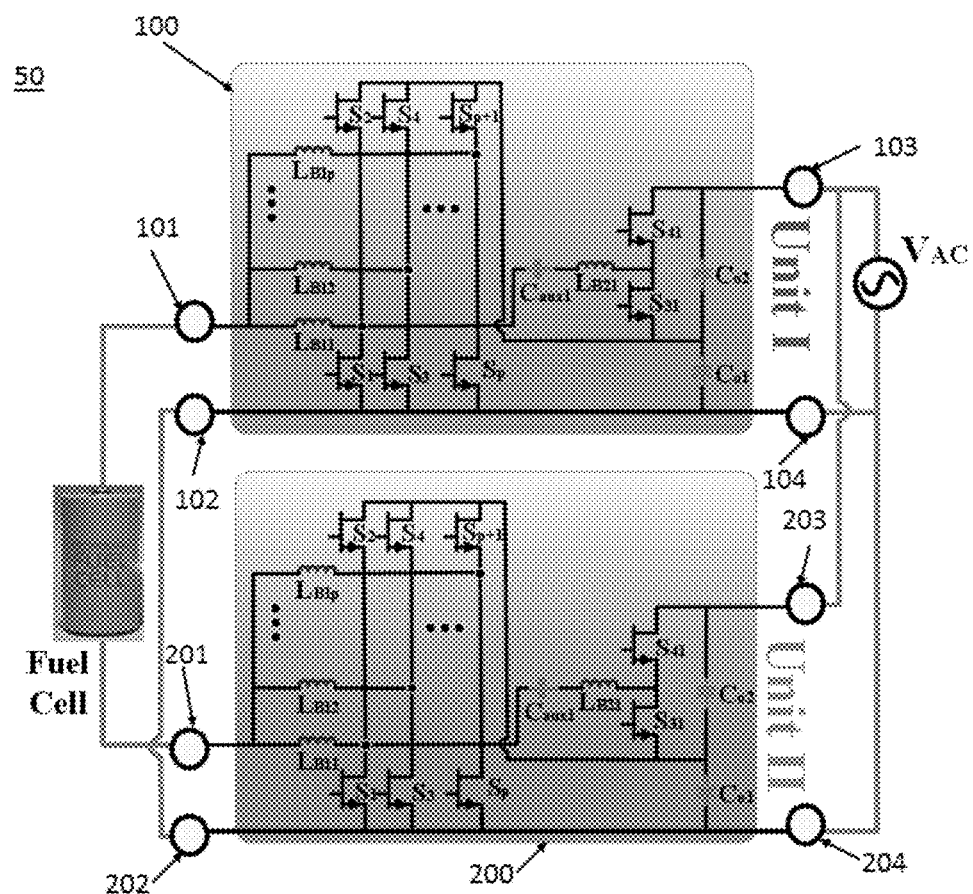
FIG. 9 shows a single-phase interleaved modular quasi-resonant inverter for high current application according to an embodiment of the subject invention.

The interleaved configuration can be utilized for applications that input current is high and the input current ripple impact the performance of the system, such as Fuel-Cell (FC). FIG. 9 shows a single-phase interleaved modular quasi-resonant inverter for high current application according to an embodiment of the subject invention. Referring to FIG. 9, a single-phase interleaved MQRI 50 for high current application includes a fuel cell connected between the first terminal 101 of the first resonant inverter 100 and the fifth terminal 201 of the second resonant inverter 200, and the ac voltage source $V_{AC}$ connected between the third terminal 103 and the fourth terminal 104. The second terminal 102 is configured to be connected to the sixth terminal 202, the third terminal 103 is configured to be connected to the seventh terminal 203, and the fourth terminal 104 is configured to be connected to the eighth terminal 204. Though the first 100 and the second 200 resonant inverter units are identical to each other, the internal circuit structure of the first resonant inverter unit 100 of FIG. 9 can be different from the internal circuit structure of the first resonant inverter unit 100 of FIG. 5.

Figure 10:
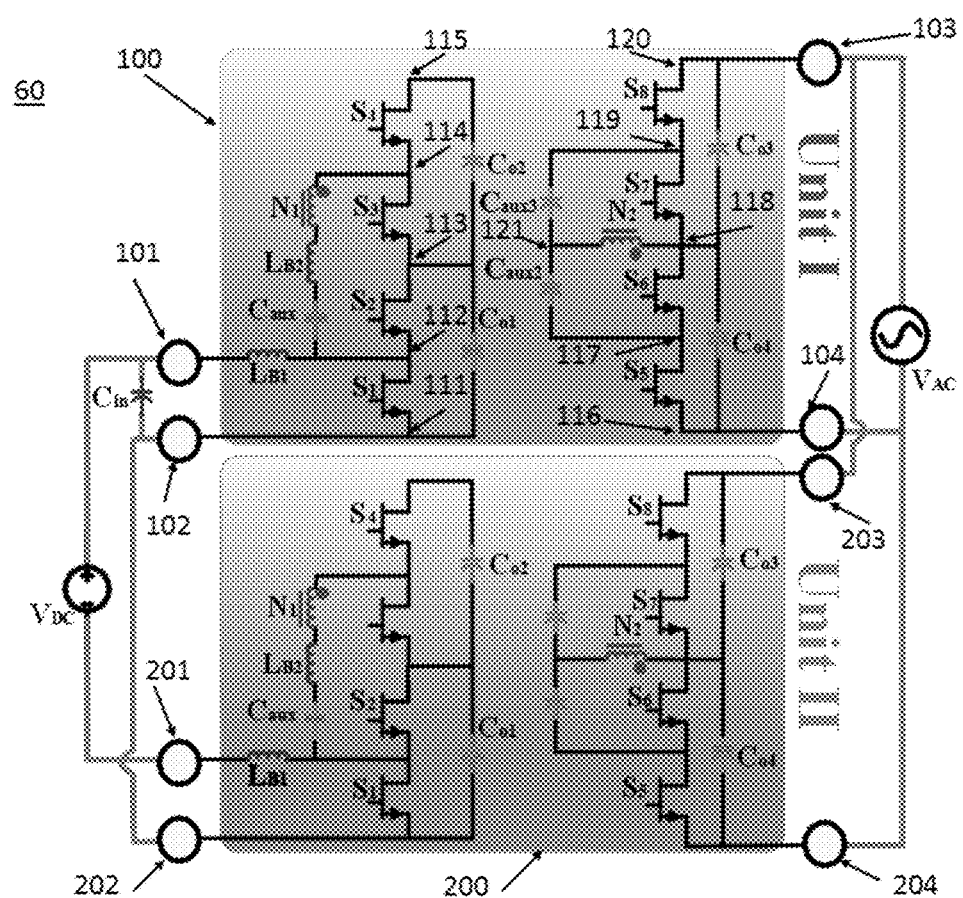
FIG. 10 shows a single-phase isolated modular quasi-resonant inverter according to an embodiment of the subject invention.

In some applications, isolation is a vital characteristic regarding the EMI issue. FIG. 10 shows a single-phase isolated modular quasi-resonant inverter according to an embodiment of the subject invention. Referring to FIG. 10, while a single-phase isolated MQRI 60 is the same as the single-phase boost MQRI 10 of FIG. 5 with respect to the dc voltage source $V_{DC}$, the ac voltage source $V_{AC}$, and the first terminal 101 to the eighth terminal 204, the first resonant inverter unit 100 of the single-phase isolated MQRI 60 is different from the first resonant inverter unit 100 of the single-phase boost MQRI 10 of FIG. 5.

The first resonant inverter unit 100 of the single-phase isolated MQRI 60 comprises eight switches including the first switch to fourth switch connected to each other and a sixth switch to an eighth switch connected to each. The first switch $S_1$ is connected between the first node 111 and the second node 112, the second switch $S_2$ is connected between the second node 112 and the third node 113, the third switch $S_3$ is connected between the third node 113 and the fourth node 114, and the fourth switch $S_4$ is connected between the fourth node 114 and the fifth node 115. In addition, the first inductor $L_{B1}$ is connected between the first terminal 101 and the second node 112, and the first auxiliary capacitor $C_{aux}$, the second inductor $L_{B2}$, and a first coupling inductor $N_1$ are connected between the second node 112 and the fourth node 114. The first resonant inverter unit 100 comprises the first output capacitor $C_{o1}$ connected between the first node 111 and the third node 113, and a second output capacitor $C_{o2}$ connected between the third node 113 and the fifth node 115. The first node 111 is configured to be electrically connected to the second terminal 102.

The first resonant inverter unit 100 of the single-phase isolated MQRI 60 further comprises a fifth switch $S_5$ connected between a sixth node 116 and a seventh node 117, a sixth switch $S_6$ connected between the seventh node 117 and an eighth node 118, a seventh switch $S_7$ connected between the eighth node 118 and a ninth node 119, and an eighth switch $S_8$ connected between the ninth node 119 and a tenth node 120. The first resonant inverter unit 100 of the single-phase isolated MQRI 60 comprises a second auxiliary capacitor $C_{aux2}$ connected between the seventh node 117 and an eleventh node 121, a third auxiliary capacitor $C_{aux3}$ connected between the eleventh node 121 and the ninth node 119, and a second coupling inductor $N_2$ connected between the eleventh node 121 and the eighth node 118. In addition, the first resonant inverter unit 100 of the single-phase isolated MQRI 60 comprises a third output capacitor $C_{o3}$ connected between the eighth node 118 and the tenth node 120, and a fourth output capacitor $C_{o4}$ connected between the sixth node 116 and the eighth node 118. The tenth node 120 is configured to be electrically connected to the third terminal 103, the sixth node 116 is configured to be electrically connected to the fourth terminal 104, and the first coupling inductor $N_1$ and the second coupling inductor $N_2$ are configured to be coupled to each other. The single-stage inverter of FIG. 10 can provide isolation to have different grounds in the input and output of the system.

Figure 11:
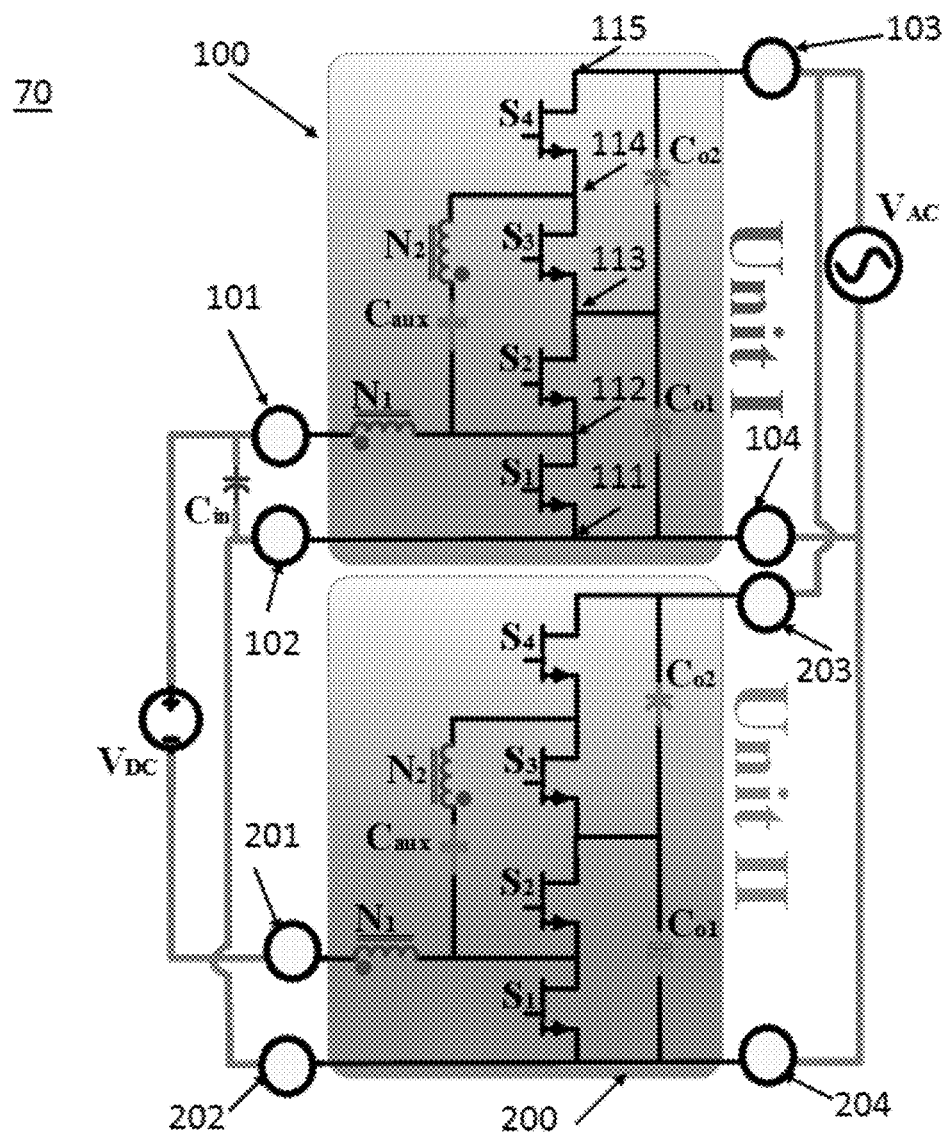
FIG. 11 shows a single-phase non-isolated modular quasi-resonant inverter with built-in transformer according to an embodiment of the subject invention.

To provide a higher step-up ratio, the built-in transformer topology can be merged with an MQRI of an embodiment of the subject invention. FIG. 11 shows a single-phase non-isolated modular quasi-resonant inverter with built-in transformer according to an embodiment of the subject invention. Referring to FIG. 11, a single-phase non-isolated MQRI 70 with built-in transformer comprises the first resonant inverter unit 100 and the second resonant inverter unit 200 that comprise coupling inductors $N_1$ and $N_2$. The first resonant inverter unit 100 comprises the first coupling inductor $N_1$ connected between the first terminal 101 and the second node 112 and the second coupling inductor $N_2$ connected between the first auxiliary capacitor $C_{aux}$ and the fourth node 114. The leakage inductance of coupled-inductor can be used in combination with capacitor to form a resonant circuit resulting in soft-switching performance of switches.

Both modularity and the active clamp structure of the inverter according to embodiments of the subject invention reduce the voltage stress of switches. Therefore, switches with smaller on-resistance $R_{DS(ON)}$ can be used, resulting in a decrease in conduction loss. The resonant circuit paves the way for realizing soft-switching, which considerably reduces the switching loss in terms of turn-on and turn-off losses. The flexibility of the inverter allows a designer to configure it for various applications with different characteristics, including but not limited to high output voltage and low input current ripple. In addition, the specific connection of modules removes the need for an output filter, thereby improving the power density, and the high voltage gain is achieved without using any transformer, contributing to an increase in both power density and efficiency.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A modular quasi-resonant inverter, comprising:
   a first resonant inverter unit including a first terminal, a second terminal, a third terminal, and fourth terminal; and
   a second resonant inverter unit including a fifth terminal, a sixth terminal, a seventh terminal, and an eighth terminal;
   the first terminal and the fifth terminal being configured such that a first source is connected between the first terminal and the fifth terminal, and
   the second terminal, the fourth terminal, the sixth terminal, and the eighth terminal being configured to be electrically connected to each other, and
   the first resonant inverter unit comprising:
      a first switch connected between a first node and a second node;
      a second switch connected between the second node and a third node;
      a third switch connected between the third node and a fourth node; and
      a fourth switch connected between the fourth node and a fifth node.

2. The modular quasi-resonant inverter according to claim 1, further comprising an input capacitor connected between the first terminal and the second terminal.

3. The modular quasi-resonant inverter according to claim 2, the third terminal and the seventh terminal being configured to be electrically connected to each other.

4. The modular quasi-resonant inverter according to claim 3, the first resonant inverter unit and the second resonant inverter unit having an identical circuit structure.

5. The modular quasi-resonant inverter according to claim 3, the first resonant inverter unit further comprising:
   a first inductor connected between the first terminal and the second node;
   a first auxiliary capacitor, a second inductor, and a first coupling inductor connected between the second node and the fourth node;
   a first output capacitor connected between the first node and the third node;
   a second output capacitor connected between the third node and the fifth node;
   a fifth switch connected between a sixth node and a seventh node;
   a sixth switch connected between the seventh node and an eighth node;
   a seventh switch connected between the eighth node and a ninth node;
   an eighth switch connected between the ninth node and a tenth node;
   a second auxiliary capacitor connected between the seventh node and an eleventh node;
   a third auxiliary capacitor connected between the eleventh node and the ninth node;
   a second coupling inductor connected between the eleventh node and the eighth node;
   a third output capacitor connected between the eighth node and the tenth node; and
   a fourth output capacitor connected between the sixth node and the eighth node,
   the first node being configured to be electrically connected to the second terminal,
   the tenth node being configured to be electrically connected to the third terminal,
   the sixth node being configured to be electrically connected to the fourth terminal, and
   the first coupling inductor and the second coupling inductor being configured to be coupled to each other.

6. The modular quasi-resonant inverter according to claim 3, further comprising a third resonant inverter unit including a ninth terminal, a ten terminal, an eleventh terminal, and a twelfth terminal, the ninth terminal being configured to be electrically connected to the fifth terminal, the tenth terminal being configured to be electrically connected to the second terminal and the sixth terminal, and the twelfth terminal being configured to be electrically connected to the fourth terminal and the eighth terminal.

7. The modular quasi-resonant inverter according to claim 1, further comprising a load between the third terminal and the fourth terminal.

8. The modular quasi-resonant inverter according to claim 7, the first source being at least one of a dc voltage source, a fuel cell, and a solar cell.

9. The modular quasi-resonant inverter according to claim 1, further comprising a dc voltage source between the third terminal and the fourth terminal, the first source being a load between the first terminal and the second terminal.

10. The modular quasi-resonant inverter according to claim 1, the first resonant inverter unit further comprising:
    a first inductor connected between the first terminal and the second node; and
    a first auxiliary capacitor, a second inductor, and a first coupling inductor connected between the second node and the fourth node.

11. The modular quasi-resonant inverter according to claim 10, the first resonant inverter unit further comprising:
    a first output capacitor connected between the first node and the third node; and
    a second output capacitor connected between the third node and the fifth node.

12. A modular quasi-resonant inverter, comprising:
    a first resonant inverter unit including a first terminal, a second terminal, a third terminal, and fourth terminal;

a second resonant inverter unit including a fifth terminal, a sixth terminal, a seventh terminal, and an eighth terminal; and an input capacitor connected between the first terminal and the second terminal the first terminal and the fifth terminal being configured such that a first source is connected between the first terminal and the fifth terminal, and the second terminal, the fourth terminal, the sixth terminal, and the eighth terminal being configured to be electrically connected to each other, the third terminal and the seventh terminal being configured to be electrically connected to each other, the first resonant inverter unit and the second resonant inverter unit having an identical circuit structure, the first resonant inverter comprising:
- a first switch connected between a first node and a second node;
- a second switch connected between the second node and a third node;
- a third switch connected between the third node and a fourth node;
- a fourth switch connected between the fourth node and a fifth node;
- a first inductor connected between the first terminal and the second node;
- a first auxiliary capacitor and a second inductor connected between the second node and the fourth node;
- a first output capacitor connected between the first node and the third node; and
- a second output capacitor connected between the third node and the fifth node, the first node being configured to be electrically connected to the second terminal and the fourth terminal, and the fifth node being configured to be electrically connected to the third terminal.

13. The modular quasi-resonant inverter according to claim 12, each of the first to fourth switches respectively being a gallium nitride metal-oxide-semiconductor field-effect transistor (GaN MOSFET) or a silicon carbide (SiC) MOSFET.

14. The modular quasi-resonant inverter according to claim 12, the first inductor and the second inductor being configured to be coupled to each other.

15. A modular quasi-resonant inverter, comprising:
a first resonant inverter unit including a first terminal, a second terminal, a third terminal, and fourth terminal;
a second resonant inverter unit including a fifth terminal, a sixth terminal, a seventh terminal, and an eighth terminal; and
an input capacitor connected between the first terminal and the second terminal,
the first terminal and the fifth terminal being configured such that a first source is connected between the first terminal and the fifth terminal,
the third terminal and the fourth terminal being configured such that a second source is connected between the third terminal and the fourth terminal,
the second terminal, the fourth terminal, the sixth terminal, and the eighth terminal being configured to be electrically connected to each other,
the first resonant inverter unit and the second resonant inverter unit having an identical circuit structure,
the first resonant inverter unit comprising:
- a first switch connected between a first node and a second node;
- a second switch connected between the second node and a third node;
- a third switch connected between the third node and a fourth node;
- a fourth switch connected between the fourth node and a fifth node;
- a first inductor connected between the first terminal and the second node;
- a first auxiliary capacitor and a second inductor connected between the second node and the fourth node;
- a first output capacitor connected between the first node and the third node; and
- a second output capacitor connected between the third node and the fifth node, the first node being configured to be electrically connected to the second terminal and the fourth terminal, and the fifth node being configured to be electrically connected to the third terminal.

16. The modular quasi-resonant inverter according to claim 15, each of the first to fourth switches respectively being a GaN MOSFET or an SiC MOSFET.

17. The modular quasi-resonant inverter according to claim 16, the first source being a dc voltage source connected between the first terminal and the fifth terminal, and the second source being an ac voltage source connected between the third terminal and the fourth terminal.

18. The modular quasi-resonant inverter according to claim 17, the first inductor and the second inductor being configured to be coupled to each other.

19. The modular quasi-resonant inverter according to claim 16, the first source being an ac voltage source connected between the first terminal and the fifth terminal, and the second source being a dc voltage source connected between the third terminal and the fourth terminal.

20. A modular quasi-resonant inverter, comprising:
a first resonant inverter unit including a first terminal, a second terminal, a third terminal, and fourth terminal;
a second resonant inverter unit including a fifth terminal, a sixth terminal, a seventh terminal, and an eighth terminal;
an input capacitor connected between the first terminal and the second terminal;
a first source connected between the first terminal and the fifth terminal; and
a second source connected between the third terminal and the fourth terminal,
the first resonant inverter unit comprising:
- a first switch connected between a first node and a second node;
- a second switch connected between the second node and a third node;
- a third switch connected between the third node and a fourth node;
- a fourth switch connected between the fourth node and a fifth node;
- a first inductor connected between the first terminal and the second node;
- a first auxiliary capacitor and a second inductor connected between the second node and the fourth node;
- a first output capacitor connected between the first node and the third node; and
- a second output capacitor connected between the third node and the fifth node, the second resonant inverter unit comprising:
- a fifth switch connected between a second unit first node and a second unit second node;

a sixth switch connected between the second unit second node and a second unit third node;

a seventh switch connected between the second unit third node and a second unit fourth node;

an eighth switch connected between the second unit fourth node and a second unit fifth node;

a third inductor connected between the fifth terminal and the second unit second node;

a second unit auxiliary capacitor and a fourth inductor connected between the second unit second node and the second unit fourth node;

a second unit first output capacitor connected between the second unit first node and the second unit third node; and a second unit second output capacitor connected between the second unit third node and the second unit fifth node, the first node being configured to be electrically connected to the second terminal and the fourth terminal, the fifth node being configured to be electrically connected to the third terminal, the second unit first node being configured to be electrically connected to the sixth terminal and the eighth terminal, the second unit fifth node being configured to be electrically connected to the seventh terminal, and the second terminal, the fourth terminal, the sixth terminal, and the eighth terminal being configured to be electrically connected to each other.

* * * * *